United States Patent [19]

Moser

[11] Patent Number: 4,655,939

[45] Date of Patent: Apr. 7, 1987

[54] LOCOMOTIVE OIL FILTER

[75] Inventor: Donald Moser, Midlothian, Va.

[73] Assignee: James River Corporation, Richmond, Va.

[21] Appl. No.: 785,651

[22] Filed: Oct. 9, 1985

[51] Int. Cl.$^4$ .............................................. B01D 29/04
[52] U.S. Cl. .................. 210/799; 210/500.1; 210/503; 210/508
[58] Field of Search ...................... 210/500.1, 503, 508, 210/767, 799

[56] References Cited

U.S. PATENT DOCUMENTS 4,455,237  6/1984  Kinsley ................................ 210/508

Primary Examiner—Frank Sever
Attorney, Agent, or Firm—Burns, Doane, Swecker & Mathis

[57] ABSTRACT

Provided is a novel locomotive oil filter for use in locomotive applications. The filter is comprised of a pulp which is comprised of lignin-containing fibers derived from a fiber source having a lignin content of at least about 10% by thermomechanically pulping a fiber source under temperature/pressure conditions of 300° F.–350° F./50 psig–120 psig and a refiner energy utilization of about 8–35 HPD/ADT. The locomotive oil filter comprising the pulp of such lignin-containing fibers overcomes the severe problems of filter swelling and plugging due to water in the locomotive oil, while also providing one with improved filtration capacity and good filtration. The use of such lignin-containing fiber pulp also gives one the economic advantage of substitution for the more expensive cotton linter generally used heretofore in railroad/locomotive lube oil filters. The pulp of lignin-containing fibers can be used in combination with other suitable pulps, e.g., high alpha cellulose content pulps, in making the filter media.

10 Claims, No Drawings

LOCOMOTIVE OIL FILTER

BACKGROUND OF THE INVENTION

1. Field of the Invention:

The present invention relates to the manufacture of filter media for application in locomotive lubrication oil systems. The present invention also relates to the filtration of locomotive lubricating oil employing such filter media.

2. Description of the Prior Art:

Railroad locomotive lube oil filters must meet certain physical characteristics in order to perform adequately and overcome the problem often encountered with water getting into the lube oil. The problem of water in the lube oil is a very common and serious problem if one does not use an appropriate lube oil filter in the locomotive engine. The result of using an inappropriate filter is that the water softens and swells the filter, the filter becomes very limp and the bottom edge of the pleat extrudes into the center tube of the filter, thereby causing blockage of the line or at least a decrease in flow rate i.e., high pressure drop. In order to test filter materials to determine whether they would be appropriate for use in locomotive engines, a water extrusion resistance test has been formulated in order to test the water extrusion resistance of the filter medium. In the test, one first tests the flow resistance of the filter paper to lube oil at a certain temperature and flow rate. Then, the paper is tested for flow resistance against a water-in-oil emulsion (generally about 1% water in oil emulsion) at the same temperature and flow rate. A ratio of the respective pressures measured, i.e., pressure at X gpm of emulsion/pressure at X gpm of lube oil, is indicative of the suitability of the filter media. The industry generally considers anything over about 1.1 as generally not suitable for application in locomotive lube oil filters.

Due to the problem of water often appearing in the locomotive lube oil, to date the industry has adopted the use of a one side coated filter paper made of cotton linter fibers. The filter used is essentially that described in U.S. Pat. No. 3,116,245 issued to Robert W. McNabb and Howard L. Dahlstrom. The use of cotton linter fibers results in a filter medium exhibiting good resistance to water extrusion and good filtration characteristics. The problem with using cotton as a source, however, is the cyclical variance in supply. Even when cotton is available, the price is prohibitive, e.g., $1200/ton, as compared to other wood pulps, such as the Kraft wood pulps, which average about $300/ton. The use of Kraft pulp in filter media for application in the filtering of locomotive lube oil is unsuitable, however, as the filter medium can exhibit poor-resistance to water extrusion. To provide a filter media which replaces at least a substantial part of the cotton generally used would be of benefit to the industry, providing the filter medium can perform adequately as a locomotive lube oil filter, i.e., exhibit adequate water extrusion resistance.

Accordingly, it is an object of the present invention to provide filter media for use in the filtering of locomotive lube oil which comprises a substantial portion of fibers other than cotton fibers.

It is yet another object of the present invention to provide such filter media which exhibit good filtering characteristics and improved filtration capacity.

It is still another object of the present invention to provide such filter media which is much less expensive than filter media made from substantially all cotton linter fibers.

Another object of the present invention is to provide a process for filtering locomotive lube oil employing such filter media.

These and other objects, as well as the scope, nature and utilization of the invention, will be apparent to those skilled in the art from the following description and the appended claims.

SUMMARY OF THE INVENTION

In accordance with the foregoing objectives, there is provided herewith a locomotive lube oil filter comprised of a lignin-containing fiber pulp. The lignin-containing fibers are derived by thermomechanically pulping a fiber source having a lignin content of at least about 10 percent under pressure conditions of about 50 psig to 120 psig, at temperature conditions of about 300° F. to 350° F., and a refiner energy utilization in the range of about 8 to 35 HPD/ADT. The resulting lignin-containing fibers are characterized by having most of their original lignin content and by having a smooth wall structure, substantially free of fiber-bonding surface fibrils and being substantially non-self-bonding to adjacent like fibers in the absence of elevated temperatures.

By employing a filter medium comprised of a substantial portion of the lignin-containing fiber pulp in accordance with the present invention, the severe problem of swelling and plugging due to water in the lube oil is obviated. Moreover, the use of the lignin-containing fiber pulp in accordance with the present invention also results in a filter medium exhibiting improved filtration capacity and good filtration. As well, one achieves the advantage of an less expensive filter medium.

The lignin-containing fiber pulp can be used in combination with other suitable pulps, e.g., high alpha cellulose content pulps, or cotton linter. It is generally preferred to use the lignin-containing fiber pulp in amounts of at least 30 percent.

DETAILED DESCRIPTION OF THE PREFERRED EMBODIMENTS

The lignin-containing fiber pulp utilized in the locomotive lube oil filter of the present invention is that pulp obtained by the processes described in U.S. Pat. Nos. 4,455,195 and 4,455,237, which patents are herein expressly incorporated by reference. The pulp is produced under selected and controlled thermomechanical conditions. It has been surprisingly found that filter media comprised of a substantial portion, e.g., at least about 30 percent, of such lignin-containing fiber pulp, do not suffer from the problem of swelling and plugging, and easily pass the water extrusion resistance test. Such filter media are, therefore, advantageously suitable for use in locomotive lube oil applications.

The source of the lignin-containing fiber is not specifically critical and may be taken from a wide variety of lignin-containing fibers, although some may, of course, be preferable to others. These sources include debarked wood (both softwood and hardwood varieties) and other lignin-containing materials, such as bamboo, bagasse, certain grasses and straws, and the like. For purposes of the present invention, the fiberforming material should have a lignin content of at least about 10% and preferably around 15% or more (most pulp woods have a lignin content in excess of 20%). At the present state of development, the preferred fiber source is debarked wood, either northern or southern softwoods or hardwoods, with some preference toward northern softwoods.

After removal of bark, which is not used in the process for obtaining the pulp, pulp wood logs are cut into chips of a size suitable for thermomechanical processing. Desirably, the typical chip size is in the range of ⅜ inch by ½ inch by ¾ inch, with the fibers aligned with the long axis of the chip. Of course, in any chipping process, the size and shape of the chips is highly randomized. Nevertheless, the objective is to seek a typical chip having a minimum dimension of about ⅜ of an inch and a maximum dimension of about ¾ of an inch, which can be reasonably approximated by screening of the chips to one inch maximum screen mesh and 1/8 minimum screen mesh.

The screened chips, typically after cleaning by a conventional water wash procedure, are reduced to pulp fibers following general techniques of the Asplund U.S. Pat. No. 2,008,892, the disclosure of which is incorporated herein by reference. A first step in this process is the preheating of the chips by steam, and this is advantageously carried out in a vessel such as a horizontal tube digester. The digester, which is a conventional piece of equipment, may be provided at the inlet with a rotary valve or similar device (also conventional) for accommodating the in-feed of wood chips while maintaining the vessel under superatmospheric steam pressure.

Wood chips generally of the indicated size are preheated at a temperature not less than about 300° F. and more desirably at a temperature in the range of about 330° F. to about 350° F. This corresponds to a pressure range of about 50 psig to about 120 psig, with the preferred range being from about 90 psig to about 120 psig. Desirably, the chips are moved progressively through a partially filled (⅛ to ½) digester, while being continually agitated. This assures highly efficient heat transfer between the steam and the wood chips and a uniform preheating. Typically, a three minute retention time inside the horizontal tube digester is adequate, and this is believed to bring the inside of the chip to within about 10° of the steam temperature.

The preheated wood chips are ground into pulp fibers in a disc refiner, while the chips are maintained in a pressurized steam atmosphere and in a substantially dry condition. Grinding is performed in a disc refiner of the general class disclosed in the aforementioned Asplund patent. More specifically, a C. E. Bauer, No. 418 counter-rotating 36 inch disc refiner is a preferred piece of equipment for this purpose. This machine utilizes a pair of oppositely rotating 36 inch discs arranged in communication with the horizontal tube digester and arranged to receive preheated wood chips from the digester (preferably under the same pressure conditions), in which case a pressure valve device is not required to be located between the digester and the disc refiner.

In accordance with known principles, when the wood chips are subjected to shear and abraded by the counter-rotating refiner discs, they are subject to further heating, as a result of the energy input of the grinder itself. It is known that, under certain conditions of preheating of the chips and operation of the disc refiner that the lignin content of the chips becomes softened and plasticized, allowing easy separation of individual fibers with minimum damage and destruction of the fibers. A desired degree of refining is controlled by adjustment of the peripheral gap between the refiner disc. In general, the narrower the gap, the more energy utilization that is required to refine the pulp and enable the fibers to emerge from the gap. Typically, such energy utilization is measured in Brake Horsepower Days per Air Dried Ton (HPD/ADT) of the raw material. For the production of pulp fibers ideally suited for the filter media of the present invention, it has been determined that the energy utilization in the disc refiner should be not less than about 8 HPD/ADT and not more than about 35 HPD/ADT. In many cases, achieving the desired energy levels requires setting of the gap at minimum size—virtually zero clearance, although for certain woods, such as southern softwoods, it may be desirable to widen the gap slightly to limit the energy to around 35 HPD.

After refining, the fibrous pulp is discharged from the refiner, through a suitable blow valve or the like, which enables the fibrous material to be taken from a pressurized condition to a nonpressurized condition.

After the disc refining operation, the pulp fibers are mixed with sufficient water to derive a slurry of about 0.5 to 1% solids, suitable for screening of the fibers. In this respect, fibers produced according to the procedures outlined are significantly longer and stiffer than more conventional pulp fibers, and are not readily screened on conventional pulp screens, without excessive rejection of good fibers and unnecessary loss of yield. Because of the fiber characteristics of the pulp thus produced, it is desirable to utilize a rotary-type screen having slots aligned circumferentially (rather than axially as is more typical). A so-called "Ultrascreen" marketed by Black-Clawson is effective in the process. Such a screen having a slot width of approximately six mils enables effective screening of the pulp, with reliable rejection of shives and other foreign matter, without excessive rejection of good fiber.

An important economic advantage of the aforementioned Asplund-type pulping procedure is the extremely high yield of fiber. The fiber yield may be as high as 95% of the dry wood starting material, as compared to chemical processes for high performance pulp, which yield as little as 35% useable fiber. To a large extent, this results from the fact that the fiber output of the pulping process retains substantially all of the lignin and hemicellulose content of the original unpulped fiber source. The chemical processes, on the other hand, substantially remove lignin and hemicellulose, which results in an immediate loss of yield. Moreover, because of the essentially fragile nature of the resulting fiber product, additional significant losses occur throughout subsequent processing. The presence of the lignin and lignim related materials in the fiber output is significantly advantageous in the ultimate filter media when the fiber production has been achieved under the conditions of the aforedescribed process. Thus, under proper pressure and temperature conditions, the lignin materials are in a plasticized state during the refining operation, which not only enables a relatively long, relatively undamaged fiber to be produced, but the resulting fiber is extremely stiff and tough, and has a very smooth outer surface. This structure is exceptionally ideal for filter media utilization, as it exhibits exceptionally low bonding characteristics and, because of its structure resembling "uncooked spaghetti" it results in an extremely porous, bulky media when laid in random form, as by wet laying or air laying for example. Directly related to the high bulk characteristic, is an extremely high freeness, in the area of 760 and above. This equals or exceeds the freeness of the highest quality high performance chemical pulps.

For the purposes of the present invention, the filter medium contains a substantial portion, i.e., at least about 30 weight percent, more preferably at least about 40 weight percent and most preferably from 40 to 75 weight percent, of the lignincontaining fiber pulp. The remaining constituency of the filter medium, if any, can comprise any suitable fibers and/or pulp which will not result in failure of the water extrusion test, i.e., a ratio of greater than about 1.1. Examples of such suitable pulps are the high alpha cellulose pulps such as the Buckeye "HPZ" pulp, XJ pulp from Merciner, Placetate from Merciner and Esparto (which is bleached grass pulp). The remaining constituency can also comprise cotton linter fibers if one so desires, such that a filter medium comprising a mixture of substantial portion of lignin-containing fibers and cotton linter fibers is within the scope of the present invention.

Kraft wood pulps may be present in the filter media in minor amounts, i.e., less than 5 to 10 weight percent, and preferably less than about 5 weight percent. The presence of greater than about 10 weight percent Kraft wood pulp results in a filter medium exhibiting insufficient water extrusion resistance to be used commercially.

In the manufacture of filters for commercial use, typically, although not necessarily, the pulp mixture is generally prepared as a slurry, beaten sufficently to assure uniform distribution, and then wet laid on a paper-making screen. Also typically, the wet web is dried and then impregnated with a binder resin. Alternatively, the filter media may be produced using air-laying techniques.

The resin, typically, is only partially cured by the web manufacturer. The ultimate filter manufacturer, later usually converts the web material into an accordion pleat configuration, quite frequently forming a cylinder of accordion pleats accommodating a generally radial flow of the lube oil to be filtered. At this stage of production, the resin in the web material may be fully cured to provide a relatively permanent set to the manufacturer's configuration.

The resulting filter medium in accordance with the present invention exhibits excellent water extrusion resistance, while also providing an economic advantage of a less expensive filter medium than the cotton linter filters now used in the industry. The cost of the lignin-containing fiber pulp used in accordance with the present invention is only about $450/ton as opposed to the $1200/ton cost of cotton fibers. Besides the economic advantage, the use of the lignin-containing fiber pulp results in a filter medium exhibiting improved filtration capacity and good filtration efficiency.

The following examples are given as specific illustrations of the present invention. It should be understood, however, that the specific details set forth in the examples are merely illustrative and in nowise limitative. All parts and percentages in the examples and the remainder of the specification are by weight unless otherwise specified.

EXAMPLE 1

Handsheets were made having the following constituencies:

A
  40 percent lignin-containing fiber pulp
  40 percent HPZ pulp
  20 percent esparto
B (Comparative): 100 percent cotton
C (Comparative):
  47 percent lignin-containing fiber pulp
  23 percent Westvaco bleached hardwood kraft
  30 percent bleached kraft pulp made from redwood chips
D
  47 percent lignin-containing fiber pulp
  30 percent placetate (bleached alpha pulp made from softwood fiber)
  23 percent esparto
E
  47 percent lignin-containing fiber pulp
  25 percent placetate
  20 percent esparto
  8 percent bleached kraft pulp made from redwood chips A water extrusion resistance test was performed on each handsheet to test the materials applicability as locomotive lube oil filter media. The runs were conducted by first testing the flow resistance of the handsheets to 82° C. lube oil at four flow rates ranging from one to four gallons per minute. The lube oil was then taken and mixed with water in a Commercial Waring Blender to form a one percent water in oil emulsion. The flow resistance of the handsheets to the emulsion at 82° C. was then tested at the same four flow rates. The flow resistance was monitored in each instance, and the results are tabulated in Table 1 below. Also noted in the Table is the water extrusion resistance ratio (pressure at X gpm of emulsion/pressure at X gpm of oil), as well as the Frazier CFM.

TABLE No. 1

| Handsheet | | Water Flow (Extrusion) Resistance | | | | Average Ratio | Frazier CFM |
|---|---|---|---|---|---|---|---|
| | | 1 gpm | 2 gpm | 3 gpm | 4 gpm | | |
| A | Oil 82° C. | 2.45 psi | 5.75 psi | 9.7 psi | 14.5 psi | | 21 |
| | Emulsion 82° C. | 2.50 | 6.00 | 10.1 | 15.2 | | |
| | Ratio | 1.02 | 1.04 | 1.04 | 1.05 | 1.04 | |
| B | Oil 82° C. | 3.1 psi | 6.4 psi | 11.3 psi | 17.1 psi | | 14 |
| | Emulsion 82° C. | 3.3 | 7.1 | 11.7 | 18.4 | | |
| | Ratio | 1.06 | 1.11 | 1.04 | 1.08 | 1.06 | |
| C | Oil 82° C. | 2.8 psi | 6.1 psi | 10.6 psi | 16.1 psi | | |
| | Emulsion 82° C. | 3.2 | 7.4 | 14.2 | 20+ | | |
| | Ratio | 1.14 | 1.27 | 1.34 | — | 1.25+ | |
| D | Oil 82° C. | 2.1 psi | 5.1 psi | 8.6 psi | 13.3 psi | | |
| | Emulsion 82° C. | 2.2 | 5.3 | 9.1 | 13.7 | | |
| | Ratio | 1.05 | 1.04 | 1.06 | 1.03 | 1.05 | |
| E | Oil 82° C. | 2.0 psi | 5.0 psi | 8.4 psi | 13.1 psi | | 26 |
| | Emulsion 82° C. | 2.3 | 5.4 | 9.1 | 14.3 | | |

TABLE No. 1-continued

| Handsheet | Water Flow (Extrusion) Resistance | | | | Average Ratio | Frazier CFM |
| --- | --- | --- | --- | --- | --- | --- |
| | 1 gpm | 2 gpm | 3 gpm | 4 gpm | | |
| Ratio | 1.15 | 1.08 | 1.08 | 1.09 | 1.10 | |

As can be seen from the foregoing Table 1, the filter media of the present invention have a ratio in the water extrusion resistance test of about 1.1 or less. This is comparable to the water extrusion resistance of an all cotton fiber filter medium (Run B). If more than just a minor amount of kraft wood pulp is utilized in the filter medium, however, the ratio exceeds 1.1 greatly (Run C).

EXAMPLE 2

The handsheets A and B were tested for filtering capacity in mgms/sq.in. and filtering efficiency using standard testing methods, in order to compare the filtering capacity and efficiency of locomotive lube oil filter media of the present invention with a conventional all cotton locomotive lube oil filter medium.

The results are tabulated below, and demonstrate that while the efficiency is comparable, the filtering capacity of the filter medium of the present invention is much improved.

TABLE No. 2

| Handsheet: | A | B |
| --- | --- | --- |
| Capacity (mgms/sq.in.) | 55 | 30 |
| Efficiency (percent) | 87 | 91.8 |

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A locomotive lube oil filter comprised of means for filtering lube oil sufficient for locomotive engine use without filter swelling or plugging due to water in the lube oil, including a filter medium having a substantial portion of lignin-containing fiber pulp derived from the disc refining of wood chips having a lignin content of at least about 10 percent under steam pressures in the range of about 90 psig to about 120 psig, at temperatures in the range of from about 330° F. to about 350° F., and using energy levels in the range of from about 8 to about 35 HPD/ADT.

2. The locomotive lube oil filter of claim 1, wherein the lignin-containing fiber pulp is present in an amount of about 30 percent or more, in combination with other pulp or fibers such that the water extrusion resistance ratio of the filter is about 1.1 or less.

3. The locomotive lube oil filter of claim 2, wherein the other pulp or fibers comprise a high alpha cellulose content pulp or cotton linter.

4. The locomotive lube oil filter of claim 2, wherein the lignin-containing fiber pulp is present in an amount of about 40 percent or more.

5. A locomotive lube oil filter comprised of means for filtering lube oil sufficient for locomotive engine use without filter swelling or plugging due to water in the lube oil, including a filter medium having,
  (a) a substantial fraction of lignin-containing fiber pulp derived from the rotary disc refining in a substantially dry state of substantially undelignified, lignin-containing material having a lignin content of at least about 10%,
  (b) said lignin-containing fiber pulp having been derived from said disc refining under steam pressures in the range of about 90 psig to about 120 psig and at temperatures in the range of from about 330° F. to about 350° F. and with energy usage in the range of from about 8 to about 35 HPD/ADT,
  (c) said lignin-containing fiber pulp being combined with other papermaking type fibers such that the water extrusion resistance ratio of the filter is about 1.1 or less, and randomly laid to form a web, and
  (d) said web being impregnated with sufficient binder resin to accomodate handling and forming.

6. The locomotive lube oil filter of claim 5, wherein the other fibers are derived from a high alpha cellulose pulp or cotton.

7. A process comprising filtration locomotive lube oil sufficient for locomotive use by:
  providing a locomotive lube oil filter and
  (ii) passing the lube oil without swelling or plugging due to water in the lube oil through a filter medium having a substantial portion of lignin-containing fiber pulp derived from the disc refining of wood chips having a lignin content of at least 10 percent under steampressures in the rangeof about 90 psig to aout 120 psig, at temperatures i the rane of about 330° F. to about 350° F., and using energy levels in the range of about 8 to about 35 HPD/ADT.

8. The process of claim 1, wherein the lignin-containing fiber pulp is present in an amount of about 30 percent or ore, in combination with other pulp or fibers such that the water extrusion resistance ratio of the filter is about 1.1 or less.

9. The process of claim 8, wherein the other pulp or fibers comprise a high alpha cellulose content pulp or cotton linter.

10. The process of claim 8, wherein the lignin-containing fiber pulp is present in an amount of about 40 percent or more.

* * * * *

UNITED STATES PATENT AND TRADEMARK OFFICE
CERTIFICATE OF CORRECTION

PATENT NO. : 4,655,939
DATED : April 7, 1987
INVENTOR(S) : DONALD MOSER, JR.

It is certified that error appears in the above-identified patent and that said Letters Patent is hereby corrected as shown below:

IN THE SPECIFICATION:

Column 4, line 3, change "disc" to --discs--;
line 54, change "lignim" to --lignin--.

Column 6, line 28, change "placetate" to --Placetate--;
line 33, change "placetate" to --Placetate--.

IN THE CLAIMS:

Column 8, line 38, change "filtration" to --filtering--;
40, before "providing", insert --(i)--;
line 47, change "aout" to --about--; and change "i the rane of" to --in the range of--;
line 50, change "claim 1" to --claim 7--;
line 52, change "cent or ore" to --cent or more--.

Signed and Sealed this

Fifteenth Day of December, 1987

Attest:

DONALD J. QUIGG

Attesting Officer     Commissioner of Patents and Trademarks